US012659396B2

(12) United States Patent
DeLong et al.

(10) Patent No.: US 12,659,396 B2
(45) Date of Patent: Jun. 16, 2026

(54) SYSTEM AND METHOD FOR ESTABLISHING WIRELESS COMMUNICATION BETWEEN A VEHICLE AND A PORTABLE COMPUTING DEVICE USING AN ENHANCED POSITION CLASSIFIER

(71) Applicant: Ford Global Technologies, LLC, Dearborn, MI (US)

(72) Inventors: Aaron Matthew DeLong, Toledo, OH (US); Vivekanandh Elangovan, Canton, MI (US); Brendan Michael Carr, Taylor, MI (US); Sabarish Balakrishnan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 18/491,097

(22) Filed: Oct. 20, 2023

(65) Prior Publication Data

US 2025/0133161 A1     Apr. 24, 2025

(51) Int. Cl.
*H04M 1/72409*      (2021.01)
*H04W 4/48*      (2018.01)
*H04W 76/14*      (2018.01)

(52) U.S. Cl.
CPC ....... *H04M 1/724098* (2022.02); *H04W 4/48* (2018.02); *H04W 76/14* (2018.02)

(58) Field of Classification Search
CPC . H04M 1/724098; H04W 4/48; H04W 76/14; H04W 4/021; H04W 4/023; H04W 4/80; H04W 4/44

USPC ......................................................... 455/41.2
See application file for complete search history.

(56) References Cited

U.S. PATENT DOCUMENTS

| 9,042,872 | B1* | 5/2015 | Breed | .................... G08B 21/02 |
| | | | | 455/414.1 |
| 2016/0065709 | A1* | 3/2016 | Lee | ......................... H04W 4/80 |
| | | | | 455/566 |
| 2023/0373440 | A1* | 11/2023 | Cheikh | ................. B60R 25/245 |

FOREIGN PATENT DOCUMENTS

| CN | 103646456 A | 3/2014 |
| KR | 20120066214 A | 6/2012 |
| KR | 101428092 B1 | 8/2014 |
| WO | 2019170336 A1 | 9/2019 |

* cited by examiner

*Primary Examiner* — Eugene Yun
(74) *Attorney, Agent, or Firm* — Joseph Zane; Brooks Kushman, P.C.

(57) ABSTRACT

In one form, the present disclosure is directed to a method including detecting, by a vehicle system, a portable computing device within a first communication area, and detecting, by the vehicle system, that the portable computing device is within a second communication area less than the first communication area using a first position classifier configured to estimate whether the portable computing device is at a vehicle having the vehicle system. The method further includes establishing, by the vehicle system, a wireless communication link with the portable computing device to play audio content from the portable computing device using an infotainment system of the vehicle in response to the portable computing device being detected within the second communication area using the first position classifier.

16 Claims, 3 Drawing Sheets

VEHICLE SYSTEM 102

COMMUNICATION SYSTEM 104

INFOTAINMENT SYSTEM 106

DETECT PCD IN FIRST COMMUNICATION AREA — 302

304 — USING FIRST POSITION CLASSIFIER, PCD IN SECOND COMMUNICATION AREA?

Y

N

308 — USING SECOND POSITION CLASSIFIER, PCD IN THIRD COMMUNICATION AREA?

N

Y

REQUEST VERFIFICATION FROM USER REGARDING PCD — 310

312 — USER INDICATES PCD TO BE USED?

N

Y

314 — DO NOT ESTABLISH COMMUNICATION.

306 — ESTABLISH COMMUNICATION BETWEEN PCD AND INFOTAINMENT SYSTEM

SYSTEM AND METHOD FOR ESTABLISHING WIRELESS COMMUNICATION BETWEEN A VEHICLE AND A PORTABLE COMPUTING DEVICE USING AN ENHANCED POSITION CLASSIFIER

TECHNICAL FIELD

The present disclosure relates to establishing wireless communication between a vehicle and a portable computing device.

BACKGROUND

The statements in this section merely provide background information related to the present disclosure and may not constitute prior art.

Advancements in vehicular technology not only includes improving a user's drive experience but also includes providing an overall entertaining and convenient user experience. In a non-limiting example, a vehicle communication system is paired and establishes a communication link with a portable computing device (PCD) (e.g., smart phone, tablet) to enable the user to access features of the PCD, such as but not limited to, having the infotainment system play audio content provided by the PCD.

SUMMARY

This section provides a general summary of the disclosure and is not a comprehensive disclosure of its full scope or all of its features.

In one form, the present disclosure is directed to a method including detecting, by a vehicle system, a portable computing device within a first communication area; detecting, by the vehicle system, that the portable computing device is within a second communication area less than the first communication area using a first position classifier configured to estimate whether the portable computing device is at a vehicle having the vehicle system; and establishing, by the vehicle system, a wireless communication link with the portable computing device to play audio content from the portable computing device using an infotainment system of the vehicle in response to the portable computing device being detected within the second communication area using the first position classifier.

In one form, the present disclosure is directed to a system for a vehicle. The system includes one or more processors and a memory storing programming instructions that are configured to cause the one or more processors to: detect a portable computing device within a first communication area; detect that the portable computing device is within a second communication area less than the first communication area using a first position classifier configured to estimate whether the portable computing device is at the vehicle; and establish, a wireless communication link with the portable computing device to play audio content from the portable computing device using an infotainment system of the vehicle in response to the portable computing device being detected within the second communication area using the first position classifier.

In one form, the present disclosure is directed to a method including detecting, by a vehicle system, a portable computing device within a first communication area that is defined based on BLUETOOTH-type communication; detecting, by the vehicle system, that the portable computing device is within a second communication area less than the first communication area using a first position classifier configured to estimate whether the portable computing device is at a vehicle having the vehicle system; establishing, by the vehicle system, a wireless communication link with the portable computing device to play audio content from the portable computing device using an infotainment system of the vehicle in response to the portable computing device being detected within the second communication area using the first position classifier; detecting, by the vehicle system, that the portable computing device is within a third communication area less than the first communication area and greater than the second communication area using a second position classifier in response to the portable computing device not being in the second communication area; and establishing, by the vehicle system, the wireless communication link with the portable computing device to play audio content from the portable computing device using the infotainment system of the vehicle in response to the portable computing device being detected within the third communication area in response to receiving authorization from a user of the vehicle. The first position classifier is configured to estimate that the portable computing device is at the vehicle using at least one of near field communication or angle of arrival estimation, and the second position classifier is configured to estimate a distance between the portable computing device and the vehicle using at least one of channel sounding or received signal strength indicator technique.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Once paired, conventional wireless communication protocols, such as BLUETOOTH (BLU) (e.g., low energy BLU, among other BLU protocols/devices), automatically establish a wireless communication link between a vehicle and a portable computing device (PCD) when the PCD is within a communication area of the vehicle. In some instances, the PCD may be within the communication area of the vehicle but is not intended to be in communication with the vehicle.

Figure 1:
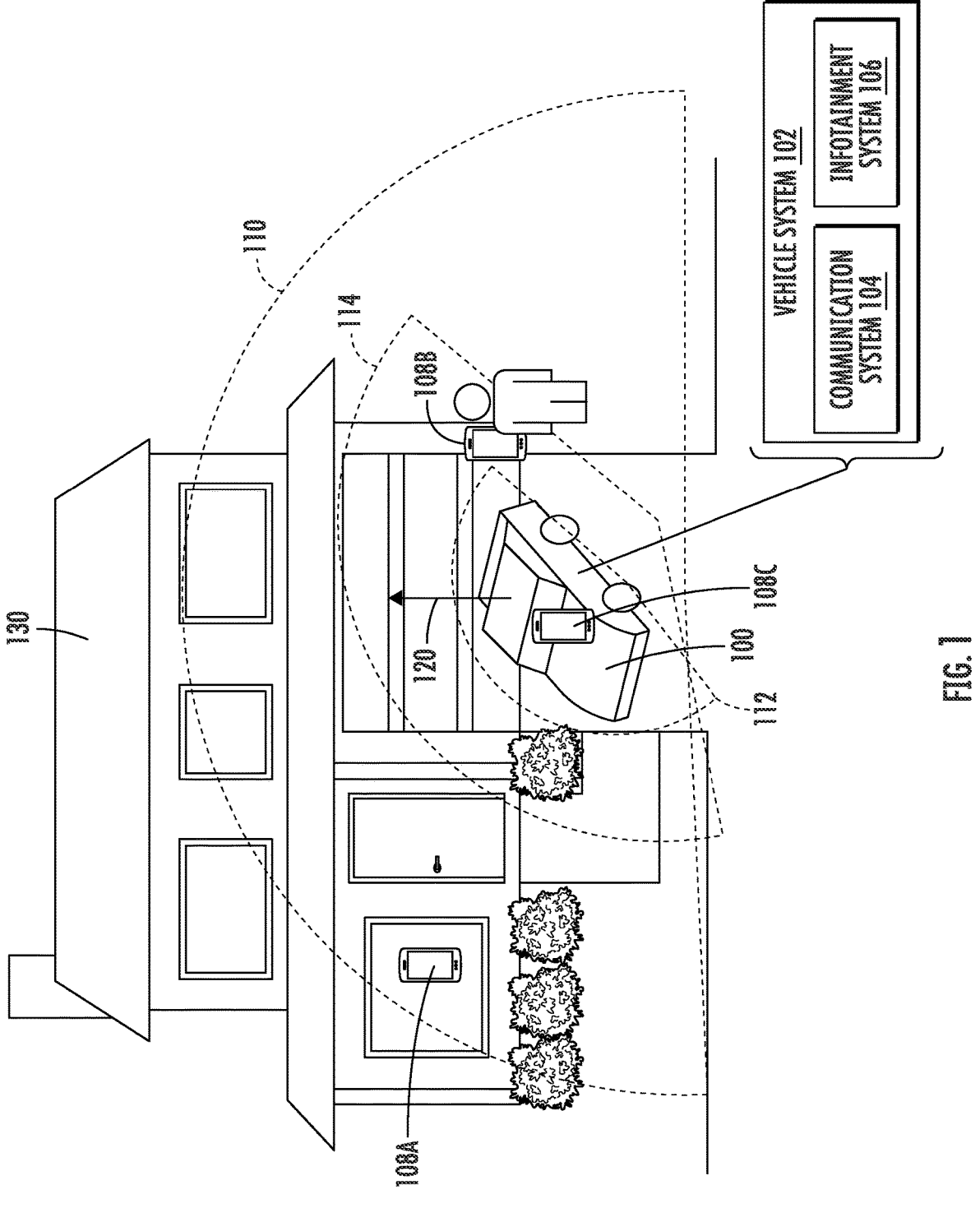
FIG. 1 illustrates portable communication devices within one or more communication areas of a vehicle in accordance with the present disclosure.

More particularly, referring to FIG. 1, a vehicle 100 includes a vehicle system 102 having a communication system 104 and an infotainment system 106. The vehicle system 102 is paired with one or more PCDs 108A, 108B, 108C (collectively "PCD 108") to communicate with the PCD 108 via a selected wireless communication protocol (e.g., BLU). With the vehicle 100 being ON (e.g., infotainment system 106 is ON), a typical vehicle system automatically establishes communication with the PCD 108 within a first communication area 110 supported by the selected wireless communication protocol. For example, if the PCD 108A is the only PCD 108 in the first communication area 110, the typical vehicle system establishes a wireless communication link with the PCD 108A and automatically transfers selected operations, such as a phone call that is in progress, to a typical infotainment system. However, the PCD 108A is not in the vehicle 100, and thus, the transfer disrupts a user of the PCD 108A and the person speaking to the user.

The vehicle system 102 of the present disclosure is configured to assess whether the PCD 108 is at the vehicle 100 (e.g., in or at least close to the vehicle 100) prior to establishing a communication link and/or transferring operations of the PCD 108 to the infotainment system 106. More particularly and as described herein, the vehicle system 102 is configured to detect whether the PCD 108 is within a second communication area 112 less than the first communication area 110 using a first position classifier configured to estimate whether the PCD 108 is at the vehicle 100. If the PCD 108 is within the second communication area 112, the vehicle system 102 establishes a communication link with the PCD 108. In one form, boundaries of the second communication area 112 is defined by the first position classifier, and generally includes most and preferably all of a body of the vehicle 100 and is substantially smaller than the first communication area 110. Accordingly, the vehicle system 102 is configured to inhibit unintended transfer of operations of the PCD 108 that is not believed to be at the vehicle 100 to the infotainment system 106.

Figure 2:
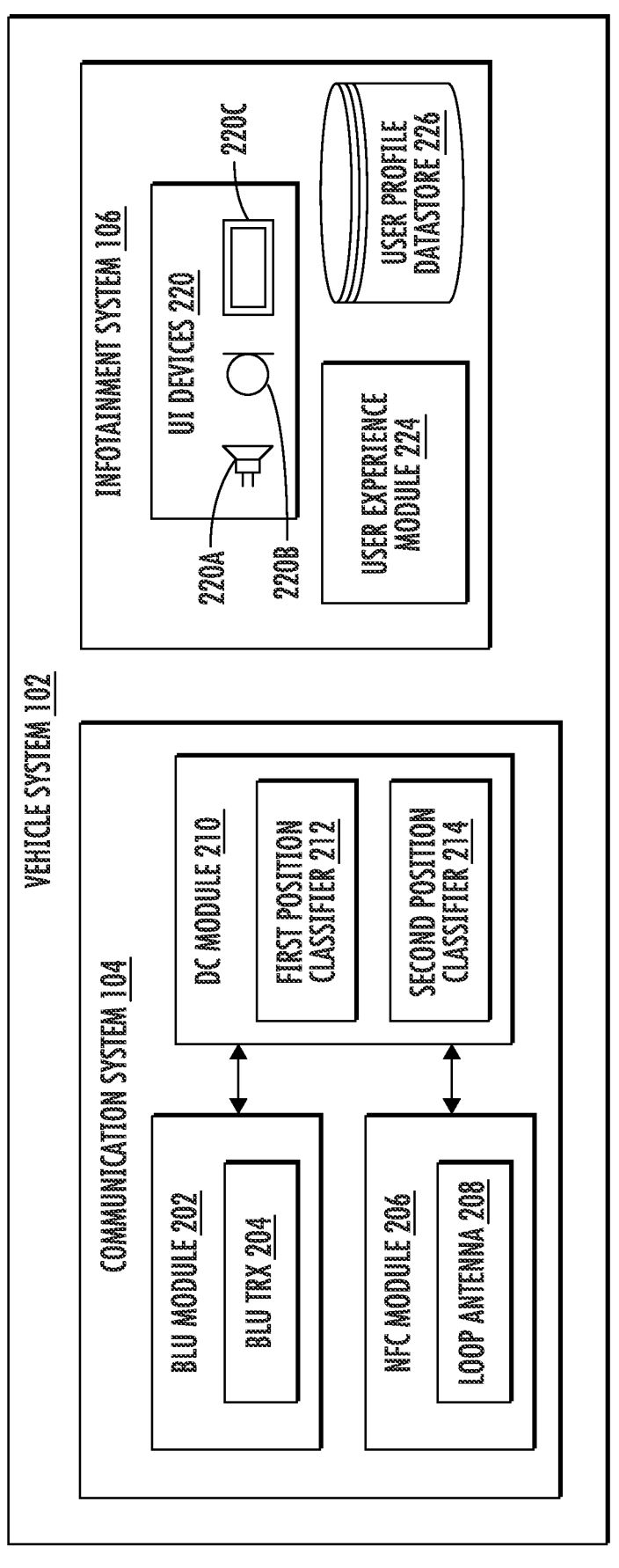
FIG. 2 is a block diagram of a vehicle system of the vehicle of FIG. 1 in accordance with the present disclosure.

Referring to FIG. 2, the communication system 104 of the vehicle system 102 is configured to control communication between the vehicle 100 and external devices, such as but not limited to, the PCD 108, roadside units (not shown), and/or other vehicles (not shown). In one form, the communication system 104 includes a BLU module 202 having a BLU transceiver 204, a near field communication (NFC) module 206 having a loop antenna 208, and a device communication (DC) module 210. It should be readily understood that the communication system 104 may include other components, such as, but not limited to a telematic control unit, for communicating with external devices using one or more communication protocols, and should not be limited to the examples provided herein.

The BLU module 202 is configured to pair and establish communication links with the PCD 108 using the BLU transceiver 204 in accordance with BLU protocols, as the selected wireless communication protocol. In operation, the reception range of the BLU transceiver 204 defines the first communication area 110 and the BLU module 202 is configured to detect the PCD 108 within the first communication area 110. In one form, the BLU module 202 is configured to store information related to a paired PCD 108 such as, but not limited to, unique identification information associated with the PCD 108, and track available PCD(s) 108 within the first communication range 110.

The NFC module 206 is configured to communicate with the PCD 108 using the loop antenna 208 in accordance with NFC protocols in which communication is enabled over a short distance (e.g., approx. 2-4 inches). As known, NFC employs inductive coupling between the loop antenna 208 and a loop antenna of the PCD 108, and in operation, the PCD 108 is positioned within a reception range of the loop antenna 208 in order to communicate with the NFC module 206. In a non-limiting example, such short range communication is employed as part of a PCD—as key entry in which the PCD 108 is employed to unlock the vehicle 100 when being placed near the loop antenna 208 provided at a door of the vehicle 100. In some variations, the vehicle 100 may include multiple loop antennas 208 to enable NFC communication at various locations in the vehicle 100.

The DC module 210 is configured to execute one or more position classifiers to detect whether the PCD 108, provided within the first communication area 110, is within a communication area that is smaller and closer to the vehicle 100. More particularly, the DC module 210 employs a first position classifier 212 to detect if the PCD 108 is in the second communication area 112 and a second position classifier 214 to detect if the PCD 108 is in a third communication area 114 (FIG. 1) that is less than the first communication area 110 and bigger than the second communication area 112. If in the second communication area 112, the PCD 108 is believed to be at the vehicle 100 and the DC module 210 automatically establishes communication with the PCD 108 and transfers operation to the infotainment system 106. If in the third communication area 114, the DC module 210 is configured to obtain additional authorization from a user prior to transferring operation to the infotainment system 106. In the following, the first position classifier 212 and the second position classifier 214 are collectively referred to as "position classifiers 212, 214."

In one form, the first position classifier 212 is configured to estimate that the PCD 108 is at the vehicle 100 using at least one of NFC, an angle of arrival estimation, or a time of flight estimation. As provided above, NFC operates when the PCD 108 is in close proximity (e.g., 2-4 in) to the loop antenna 208 of the vehicle 100. Accordingly, if the NFC module 206 detects the PCD 108, the DC module determines 210 that the PCD 108 is within the second communication area 112 and, thus, at the vehicle 100.

With respect to the angle of arrival estimation, the DC module 210 is configured to estimate a position of the PCD 108 based on an angle of arrival of signal from the PCD 108 received via the BLU module 202. The angle of arrival evaluates the direction of the signal as it relates to a Z-axis 120 of the vehicle 100 (see FIG. 1). Using the location of the PCD 108 based on the angle of arrival, the DC module 210 is configured to determine whether a distance of the PCD 108 from the vehicle 100 is within a threshold distance, where the threshold distance is selected to correspond to a distance near or within the vehicle 100.

Time of flight may also be employed to detect a distance between the PCD 108 and the vehicle 100. Using known time of flight measurement algorithms, the DC module 210 detects the distance and compares it to a threshold distance, wherein the threshold distance is selected to correspond to a distance near or within the vehicle 100.

In the event the PCD 108 is not within the second communication area 112, the DC module 210 is configured to detect whether the PCD 108 is within the third communication area 1141, which is less than the first communication area 110 and greater than the second communication area 112 using the second position classifier 212. Specifically, the second position classifier 212 is configured to estimate a distance between the PCD 108 and the vehicle 100 and more specifically, the communication system 104, using at least one of known channel sounding estimation or known received signal strength indicator estimation. If the PCD 108 is in the third communication area 114, which may be defined based on selected distance threshold, the DC module 210 is configured to establish communication with the PCD 108.

By using the first position classifier 212 and the second position classifier 214, the DC module 210 further narrows the communication area of the vehicle 100 to select the PCD 108 that is likely to be used in the vehicle 100, and thus, inhibits unintended transfer of selected operations of the PCD 108 to the infotainment system 106.

The infotainment system 106 is configured to provide information and access to various auxiliary features, such as, but not limited to, audio system, navigation system, and/or climate control system. In one form, the infotainment system 106 includes user interface (UI) devices 220 for interacting with the user, such as, audio devices (e.g., speaker 220A and/or microphone 220B), display device 220C (e.g., a head-up display and/or a liquid crystal display with touchscreen), and/or other suitable input devices (e.g., buttons, knobs).

The infotainment system 106 further includes a user experience module 224 and a user profile datastore 226. In one form, the user experience module 224 is configured to exchange information with the PCD 108 employing the communication link established via the communication system 104 to enable the infotainment system 106 to access the PCD 108. That is, using known techniques, the user experience module 224 is configured to enable the user to control and access features of the PCD 108, such as, but not limited to: playing selected audio content available via the PCD 108 using the UI devices 220, and/or presenting software applications available via the PCD 108 and accessible via the UI devices 220. In a non-limiting example, if the PCD 108 is capable of making phone calls, the user experience module 224 enables the user to initiate calls using the infotainment system 106 which is in communication with the PCD 108 via, for example, BLUETOOTH communication link. In another example, the user experience module 224 enables the user to select audio content, such as music or podcasts, available via the PCD 108 and played using the UI devices 220.

In some implementation, the user experience module 224 is configured to store data related to one or more users in the user profile datastore 226 to assist in providing a customizable experience for each user. In one form, the user profile datastore 226 stores a profile record for the user, where the profile record includes information such as, but not limited to, user identification (e.g., name); PCD identification (e.g., a unique identification associated with the PCD 108 used by the user); and/or preidentified preferred software applications to be initiated when the PCD 108 is in communication with the vehicle 100.

In one form, the profile record may also rank the users such that a primary user of the vehicle 100 may be identified as the first preferred user. Accordingly, if multiple PCDs 108 are provided within the second communication area 114, the user experience module 224 is configured to select from among the PCDs 108 based on the stored profile records (i.e., user profiles) which can be identified based on, for example, the PCD identification stored in the profile record and the identification of the PCD which is provided by the communication system 104. If only one of the PCDs 108 is associated with a profile record, the user experience module 224 requests the DC module 210 to establish communication with the PCD 108 associated with the profile record. Alternatively, if multiple PCDs 108 are associated with profile records stored in the user profile datastore 226, the user experience module 224 is configured to select the PCD 108 associated with a profile record having the highest ranking.

In some forms, the user experience module 224 tracks usage of the PCD 108 using the profile record of the user profile datastore 226 to compile historical data of PCD(s) 108 being employed. Based on the historical data and known machine learning techniques, the user experience module 224 may include a user preference model to select one PCD 108 as a preferred device to communicate with when multiple PCDs 108 are within the second communication area 112.

Figure 3:
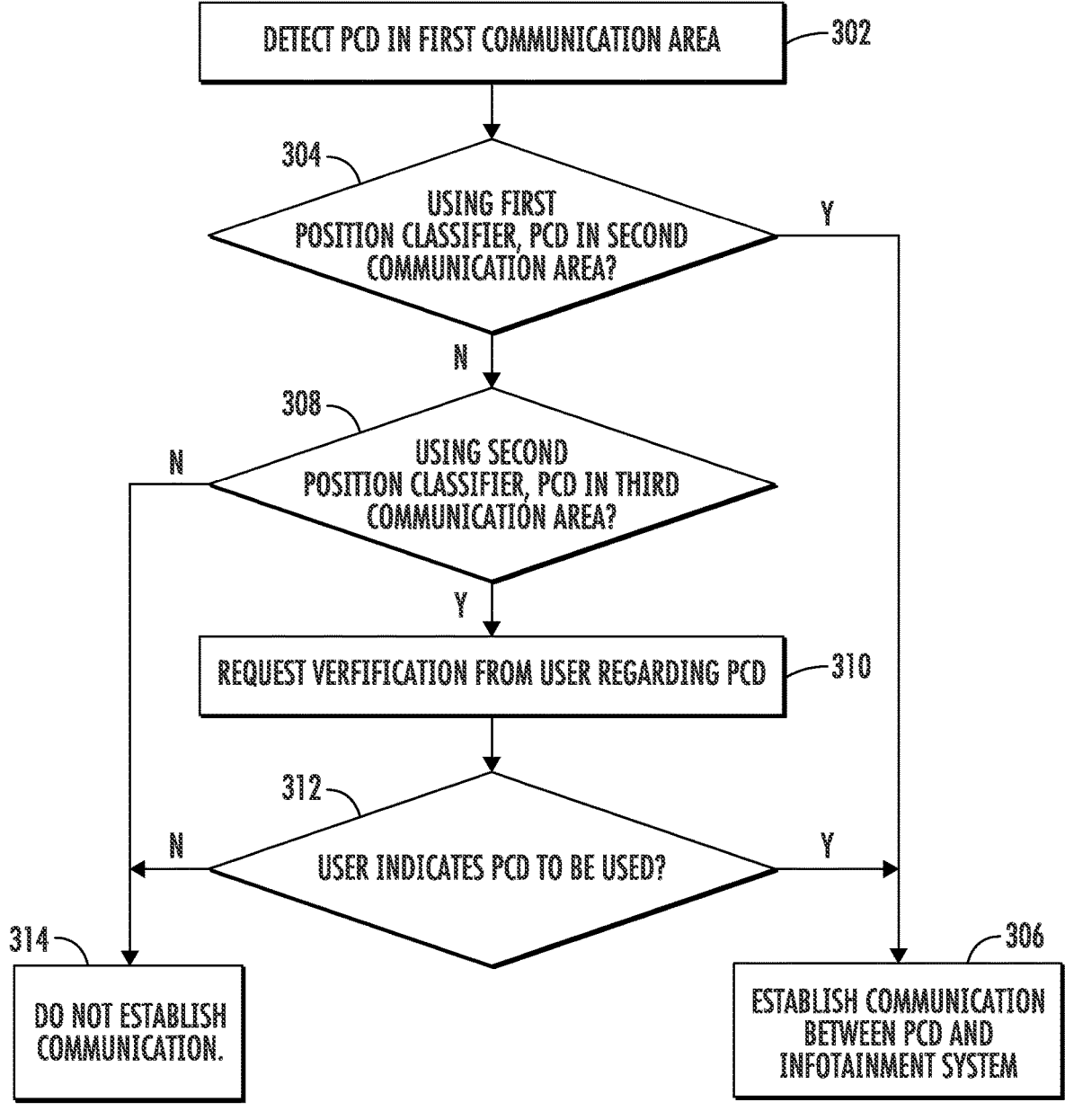
FIG. 3 is a flowchart of a communication routine executed by the vehicle system in accordance with the present disclosure.

Referring to FIG. 3, an example communication routine 300 executed by the vehicle system is provided. At operation 302, the vehicle system 102 detects the PCD 108 in the first communication area 110 based on, for example, reception range of the BLU module 202. In a non-limiting example and referring to FIG. 1, the BLU module 202 detects the PCDs 108A, 108B, and 108C that were previously paired to the BLU module 202 and is within the first communication area 110.

At operation 304, the vehicle system 102 determines whether the PCD 108 is within the second communication area 112 using the first position classifier 212, and if so, establishes communication with the PCD 108 and the infotainment system at operation 306. In the example of FIG. 1, the PCD 108C is provided in the second communication area 112, whereas PCDs 108A and 108B are outside the second communication area 112. If the PCD 108A is previously identified as a preferred PCD, the typical vehicle system may automatically connect to the PCD 108A even though it is far from the vehicle 100 (e.g., in a house 130 of FIG. 1). With the vehicle system 102 of the present disclosure, the PCD 108C is selected to communicate with the infotainment system 106 since it is within the second communication area 112.

In some variations, once communication is established, the vehicle system 102 is configured to detect whether the PCD 108 is providing audio content (e.g., a phone call is in progress, music/podcast is being played) using known techniques. If the PCD 108 is within the second communication area 112, the vehicle system 102 is configured to automatically play audio content employing the speakers 220A.

If the PCD 108 is not in the second communication area 112, the vehicle system 102 determines if the PCD 108 is in the third communication area 114 using the second position classifier 214, at operation 308. For example, assuming the PCD 108C is not in the second communication area 112, the vehicle system 102 may determine if the PCD 108B is in the third communication area 114 since the PCD 108B is not in second communication area 112. In one form, if the PCD 108 is detected in the third communication area 114, the vehicle system 102, at operation 312, requests verification from the user regarding the PCD 108 and specifically, if the PCD 108 is to be in communication with the infotainment system 106. For example, using one or more of the UI devices 220, the infotainment system 106 provides a message to the user requesting an input indicating that the PCD 108 is to be in communication with the infotainment system 106. If the verification is received, the vehicle system 102 establishes communication between the infotainment system 106 and the PCD 108, at operation 306. Alternatively, if verification is not received, the vehicle system 102 does not establish communication, at operation 314.

In some variations, if the PCD 108 is not in the second communication area 112, but is in the third communication area 114, the vehicle system 102 is configured to establish communication between the infotainment system 106 and the PCD 108 without requesting verification, and instead may request verification if the PCD 108 is providing audio content at the time communication is being established. Specifically, the vehicle system 102 is configured to detect whether the PCD 108 is providing audio content and prior to transferring operation of the PCD 108 to the infotainment system 106, the vehicle system 102 provides a message via the UI devices 220 inquiring whether the audio content is to be emitted via the infotainment system 106. If an input indicating such transfer is approved, the vehicle system 102 plays the audio content via the speaker 220A.

By having the user verify whether the infotainment system 106 should play the audio content from the PCD 108, the vehicle system 102 mitigates unintended transfer of the audio content. Specifically, referring to FIG. 1, the PCD 108B is detected within the first communication area and the third communication area, but is not intended to be used in the vehicle 100. Accordingly, prior to transferring operation of the PCD 108B to the infotainment system 106, the user must first verify the transfer of the communication and/or the audio content if audio content is being provided by the PCD 108B.

It should readily be understood that the vehicle system 102 may be configured in various suitable ways and should not be limited to the communication routine 300. For example, the routine 300 may include operations to select a PCD 108 from among a plurality of PCDs 108 that are within the second communication area 112 in accordance with the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
detecting, by a vehicle system, a portable computing device within a first communication area;
detecting, by the vehicle system, that the portable computing device is within a second communication area less than the first communication area using a first position classifier configured to estimate whether the portable computing device is at a vehicle having the vehicle system;
detecting, by the vehicle system, that the portable computing device is within a third communication area less than the first communication area and greater than the second communication area using a second position classifier in response to the portable computing device not being in the second communication area;
automatically establishing, by the vehicle system, a wireless communication link with the portable computing device to play audio content from the portable computing device using an infotainment system of the vehicle in response to the portable computing device being detected within the second communication area using the first position classifier; and
in response to the portable computing device detected within the third communication area:
detecting, by the vehicle system, that the portable computing device provided in the third communication area is playing audio content;
providing, by the vehicle system, a message via a user interface requesting if the audio content is to be emitted via the infotainment system of the vehicle; and playing, by the vehicle system via the infotainment system, the audio content in response to receiving an input via the user interface indicating that the audio content is to be emitted.

2. The method of claim 1, wherein:

the first position classifier is configured to estimate that the portable computing device is at the vehicle using at least one of a near field communication, an angle of arrival estimation, or a time of flight estimation, and the second position classifier is configured to estimate a distance between the portable computing device and the vehicle using at least one of channel sounding or received signal strength indicator technique.

3. The method of claim 1, wherein the first position classifier is configured to estimate that the portable computing device is at the vehicle using at least one of a near field communication, an angle of arrival estimation, or a time of flight estimation.

4. The method of claim 3, wherein the angle of arrival estimation is used for the first position classifier to estimate a position of the portable computing device relative to a Z-axis of the vehicle.

5. The method of claim 1, wherein at least two portable computing devices are detected within the first communication area and the second communication area.

6. The method of claim 5, further comprising selecting, by the vehicle system, one of the at least two portable computing devices that is associated with a user profile stored by the vehicle system, wherein the wireless communication link is established with the one of the at least two portable computing devices.

7. The method of claim 5, further comprising selecting, by the vehicle system, one of the at least two portable computing devices that is identified as a preferred device based on a user preference model.

8. The method of claim 1, wherein the first communication area is defined based on BLUETOOTH-type communication.

9. A system for a vehicle, comprising:

one or more processors; and a memory storing programming instructions that are configured to cause the one or more processors to:

detect a portable computing device within a first communication area;

detect that the portable computing device is within a second communication area less than the first communication area using a first position classifier configured to estimate whether the portable computing device is at the vehicle;

detect that the portable computing device is within a third communication area less than the first communication area and greater than the second communication area using a second position classifier in response to the portable computing device not being in the second communication area;

automatically establish, a wireless communication link with the portable computing device to play audio content from the portable computing device using an infotainment system of the vehicle in response to the portable computing device being detected within the second communication area using the first position classifier in response to the portable computing device detected within the third communication area:

detect that the portable computing device provided in the third communication area is playing audio content;

provide a message via a user interface requesting if the audio content is to be emitted via the infotainment system of the vehicle; and play, via the infotainment system, the audio content in response to receiving an input via the user interface indicating that the audio content is to be emitted.

10. The system of claim 9, wherein:

the first position classifier is configured to estimate that the portable computing device is at the vehicle using at least one of a near field communication, an angle of arrival estimation, or a time of flight estimation, and the second position classifier is configured to estimate a distance between the portable computing device and the vehicle using at least one of channel sounding or received signal strength indicator technique.

11. The system of claim 9, wherein the first position classifier is configured to estimate that the portable computing device is at the vehicle using at least one of a near field communication, an angle of arrival estimation, or a time of flight estimation.

12. The system of claim 11, wherein the angle of arrival estimation is used for the first position classifier to estimate a position of the portable computing device relative to a Z-axis of the vehicle.

13. The system of claim 9, wherein:

at least two portable computing devices are detected within the first communication area and the second communication area, the memory is configured to store a profile record for a user of the vehicle; and the programming instructions are further configured to cause the one or more processors to select one of the at least two portable computing devices that is associated with the profile record stored, wherein the wireless communication link is established with the one of the at least two portable computing devices.

14. The system of claim 9, wherein:

at least two portable computing devices are detected within the first communication area and the second communication area, and the programming instructions are further configured to cause the one or more processors to select one of the at least two portable computing devices that is identified as a preferred device based on a user preference model.

15. The system of claim 9, wherein the first communication area is defined based on BLUETOOTH-type communication.

16. A method comprising:

detecting, by a vehicle system, a portable computing device within a first communication area that is defined based on BLUETOOTH-type communication;

detecting, by the vehicle system, that the portable computing device is within a second communication area less than the first communication area using a first position classifier configured to estimate whether the portable computing device is at a vehicle having the vehicle system;

automatically establishing, by the vehicle system, a wireless communication link with the portable computing device to play audio content from the portable computing device using an infotainment system of the vehicle in response to the portable computing device being detected within the second communication area using the first position classifier;

detecting, by the vehicle system, that the portable computing device is within a third communication area less than the first communication area and greater than the second communication area using a second position classifier in response to the portable computing device not being in the second communication area; and in response to the portable computing device detected within the third communication area, detecting, by the vehicle system, that the portable computing device provided in the third communication area is playing audio content;

providing, by the vehicle system, a message via a user interface requesting if the audio content is to be emitted via the infotainment system of the vehicle; and playing, by the vehicle system via the infotainment system, the audio content in response to receiving an input via the user interface indicating that the audio content is to be emitted, wherein:

the first position classifier is configured to estimate that the portable computing device is at the vehicle using at least one of a near field communication, an angle of arrival estimation, or a time of flight estimation, and the second position classifier is configured to estimate a distance between the portable computing device and the vehicle using at least one of channel sounding or received signal strength indicator technique.

* * * * *